United States Patent Office 2,834,796
Patented May 13, 1958

2,834,796
PREPARATION OF IRON CYCLOPENTADIENIDES

Maurice R. Barusch and Eddie G. Lindstrom, Richmond, Calif., assignors to California Research Corporation, San Francisco, Calif., a corporation of Delaware No Drawing. Application March 2, 1953
Serial No. 350,216

10 Claims. (Cl. 260—439)

The present invention relates to an improved method of preparing iron biscyclopentadienyl and its substituted derivatives.

Recently, a novel compound consisting solely of iron, carbon and hydrogen has been prepared and identified as iron biscyclopentadienyl with the empirical formula $FeC_{10}H_{10}$. This compound has been prepared according to Healy and Pauson in "Nature," vol. 168, page 1039 (December 15, 1951), by a Grignard reaction of cyclopentadienylmagnesiumbromide and anhydrous ferric chloride, and according to Miller, Tebboth and Tremaine in "Journal of the Chemical Society" (February 1952), page 632, by the reaction of cyclopentadiene and reduced iron in nitrogen at 300° C.

Iron biscyclopentadienyl exists as a yellow crystalline solid with a melting point of 172.5–173° C. The compound sublimes readily without decomposition, is insoluble in water but soluble in most organic solvents. In contrast to the ordinary organometallic compounds, iron biscyclopentadienyl, which is now commonly referred to as ferrocene, possesses remarkable stability to heat, light, and oxidation, and has found practical application in numerous situations where other compounds of iron possess inherent disadvantages, for example, as an antiknock agent in gasoline compositions, a drier in coating compositions, or as a catalyst for the oxidation of asphalt.

The presently known methods of preparing iron biscyclopentadienyl, as represented by the aforementioned references, leave much to be desired in terms of a commercial operation. According to the present invention, it has been found that iron biscyclopentadienyl and its substituted derivatives may be prepared by a liquid phase reaction of an alkali metal salt of cyclopentadiene or its substituted derivatives with an anhydrous iron salt in the presence of a non-aqueous liquid reaction medium at temperatures in the range of about —80 to +100° C.

The organic reactant of the process may be described as an alkali metal cyclopentadienide or an alkali metal salt of an organic compound containing a cyclopentadiene nucleus which may be substituted by one or more substituent groups. In its preferred aspect, this reactant may be represented by the following structural formula:

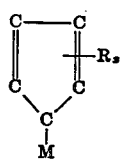

wherein M is an alkali metal and preferably sodium, R is an aliphatic radical and preferably an alkyl radical, and $x$ is zero or an integer from 1 to 5. The alkali metal cyclopentadienide reactant may be prepared directly by formation of the alkali metal salt of cyclopentadiene or of the desired cyclopentadiene derivative possessing an acidic hydrogen in the cyclopentadiene nucleus; or cyclopentadiene itself may be reacted to form its alkali metal salt and the resulting cyclopentadienide reacted to incorporate the desired substituent groups, followed by reconversion to the alkali metal salt. The iron reactant may be presented in the form of a ferric or ferrous salt of an organic or inorganic compound, provided the reactant is introduced in a substantially anhydrous form. It is preferable to conduct the reaction with an anhydrous inorganic ferrous salt such as ferrous chloride.

Of critical importance to the conduct of the process is the presence of the non-aqueous liquid medium. In general, the desired reaction will proceed in the presence of a liquid medium which is non-aqueous, substantially inert to the alkali metal cyclopentadienide reactant and possesses sufficient solvent power for the anhydrous iron salt. Representative of these liquids are the aliphatic and aromatic hydrocarbons, alcohols, ethers, amines and ammonia, etc. For the purpose of the present invention, it is preferred to operate the process in the presence of the lower alkanols and particularly ethanol. The temperature at which the reaction is conducted is not critical to the process and depends primarily upon the choice of the liquid medium employed. As previously set forth, the process is conducted in the liquid phase so that the reaction temperatures and pressures should be adjusted so that the reactants and the non-aqueous liquid medium are maintained as liquids. Additionally, low reaction temperatures are desirable to avoid excessive polymerization of the organic reactant. Generally, temperatures in the range of —80 to +100° C. will be suitable for the reaction.

In its preferred aspect, the present invention contemplates the reaction of an alkali metal cyclopentadienide and particularly a sodium cyclopentadienide which may contain one or more alkyl substituents attached to the nucleus, with an anhydrous inorganic ferrous salt in the presence of a lower alkanol and particularly ethanol. Additionally, the preparation of the alkali metal cyclopentadienide reactant may be conducted in the presence of the same liquid medium as, for example, the reaction of cyclopentadiene with sodium ethylate.

The reaction process of the invention will be further illustrated by the following specific examples. It is to be understood that these examples are presented for illustrative purposes only and are not intended as limitations of the invention.

Example 1

½ gram atom of sodium (11.5 grams) in small pieces was added over a period of two hours to 200 cc. of absolute ethyl alcohol contained in a half-liter flask provided with reflux condenser and stirred. After cooling the reaction mixture to room temperature, ½ gram mol (41 cc.) of freshly distilled cyclopentadiene was added dropwise. Thereafter, a solution of 31.5 grams (0.25 gram mol) of anhydrous ferrous chloride in 200 cc. of absolute alcohol was added. After thirty minutes, the entire reaction mixture was poured into 600 cc. of water with the resultant formation of a flocculent precipitate. The precipitate was extracted exhaustively with chloroform and the filtrate evaporated to dryness. 20 grams representing a 43 weight percent yield of yellow crystalline iron biscyclopentadienyl were recovered.

Example 2

90 gallons of absolute ethyl alcohol were charged to a 300 gallon jacketed stainless-steel reaction kettle provided with a motor stirrer and vent line. 57 pounds (2.48 pound moles) of sodium in the form of 1-inch cubes were then added in 5-pound increments with continued stirring, the interval between each incremental addition being regulated to assure substantially complete reaction of the sodium last added as evidenced by hydrogen evolution. The reaction was rapid in the beginning with considerable heat evolution and the reaction mixture was held at about 100° F. temperature by circulating cooled water through the kettle jacket. After about 80% of the sodium had been added, the reaction rate had fallen to such an extent that it was necessary to raise the reaction temperature to about 130° F. by circulating hot water through the kettle jacket and this temperature was maintained to the end of the sodium addition. The total time required for complete reaction of the sodium with ethanol was 16 hours. To the resultant solution of sodium ethylate in ethanol, 164 pounds (2.48 pound moles) of freshly-distilled cyclopentadiene monomer was added at the rate of about one gallon per minute with continuous agitation after lowering the kettle temperature to about 90° F. A slurry of 176 pounds (10% excess) of anhydrous ferrous chloride in 30 gallons of absolute alcohol was stirred into the reaction mixture containing sodium cyclopentadienide, together with some unreacted sodium ethylate and cyclopentadiene, at a rate of about 1 gallon per minute, resulting in the formation of the desired iron biscyclopentadienyl.

A number of side reaction products resulted from the presence of unreacted sodium ethylate and polymerized cyclopentadiene. In order to purify the desired reaction product, a slurry of 20 pounds of filtercel in an acid solution of stannous chloride (85 gallons of water, 156 pounds of 12-N hydrochloric acid, 40 pounds of stannous chloride dihydrate) was prepared in a second 300-gallon stirred glass-lined kettle. The reaction mixture from the first kettle was then pumped into the slurry, mixed and filtered. The function of the acid was to bring various by-product iron salts into solution, whereas the stannous chloride prevented oxidation of the iron biscyclopentadienyl. As a result of the acid treatment, the reaction mixture filtered with relative ease and the bulk of the filter cake was materially reduced. It has been possible to avoid the use of stannous chloride by reducing the amount of 12-N hydrochloric acid to 60 pounds at the cost of a slower but operable filter rate. The filter cake from the foregoing operation was then slurried with 150 gallons of iso-octane at 150° F. and the remaining solids allowed to settle. The clear supernatant liquid was then decanted and cooled to 75° F. and the resulting crop of iron biscyclopentadienyl crystals (55 pounds on a dry basis) was filtered off. The filtrate was employed in a second hot extraction of the original filter cake and an additional 22 pounds, dry basis, of product was thus obtained. A further 26 pounds of product was obtained by evaporating the second filtrate to dryness. The total weight of iron biscyclopentadienyl (M. P. 173–173.5° C.) recovered was 103 pounds, representing a yield of 45 weight percent based on cyclopentadiene or sodium charged.

*Example 3*

23 grams of sodium were reacted with 277 ml. (219 grams) of absolute ethanol contained in a flask provided with a condenser and with means for agitation and heat control. When all of the sodium was in solution, 66 grams of cyclopentadiene monomer was added over a period of 25 minutes at a temperature of 90–100° F. The mixture was agitated for 45 minutes. A slurry of anhydrous ferrous chloride in 75 grams of absolute ethanol was added over a period of about 30 minutes at room temperature initially, and rising to a final temperature of 130° F. An additional 25 ml. of ethanol was used in completing the addition of the slurry and the resulting mixture was agitated for one-half hour at room temperature. The reaction mixture was then treated with 125 ml. of 2-N hydrochloric acid and filtered. The weight of the wet filter cake was 192 grams. The cake was allowed to air-dry overnight, and was then recrystallized from iso-octane to give 45.7 grams of purified iron biscyclopentadienyl. The original filtrate was diluted with additional water and filtered to yield 2 grams of additional iron biscyclopentadienyl. Total yield recovered was 51.3 mol percent of theory based on the sodium charged.

Corresponding preparations were conducted employing methanol and N-butanol in place of the ethanol. The yields of iron biscyclopentadienyl were 23 mol percent and 48 mol percent, respectively, based on sodium charged.

Obviously, many modifications and variations of the invention, as hereinbefore set forth, may be made without departing from the spirit and scope thereof, and therefore only such limitations should be imposed as are indicated in the appended claims.

We claim:

1. A process for the preparation of an iron cyclopentadienide which comprises reacting an alkali metal cyclopentadienide with an anhydrous iron salt in the presence of a non-aqueous liquid reaction medium.

2. A method of preparing an iron cyclopentadienide which comprises reacting in the liquid phase an alkali metal salt of a compound selected from the group consisting of cyclopentadiene and its aliphatic hydrocarbon substituted derivatives with an anhydrous iron salt in the presence of a non-aqueous liquid reaction medium at temperatures in the range of about $-80$ to $+100°$ C.

3. A method of preparing an iron cyclopentadienide which comprises reacting in the liquid phase an alkali metal salt of a compound selected from the group consisting of cyclopentadiene and its aliphatic hydrocarbon substituted derivatives with an anhydrous inorganic ferrous salt in the presence of a non-aqueous liquid reaction medium at temperatures in the range of about $-80$ to $+100°$ C.

4. A process for the preparation of iron cyclopentadienide which comprises the liquid phase reaction of an alkali metal cyclopentadienide with an anhydrous inorganic ferrous salt in the presence of a lower alkanol.

5. A process for the preparation of iron cyclopentadienide which comprises the liquid phase reaction of an alkali metal cyclopentadienide with an anhydrous inorganic ferrous salt in the presence of ethanol.

6. A process for the preparation of an iron cyclopentadienide which consists of reacting a cyclopentadiene with an alkali metal salt of a lower alkanol and thereafter contacting in the liquid phase and in the presence of a lower alkanol the resulting alkali metal cyclopentadienide with an anhydrous inorganic ferrous salt.

7. A process for the production of iron biscyclopentadienyl which comprises the liquid phase reaction of sodium cyclopentadienyl with an anhydrous inorganic ferrous salt in the presence of ethanol.

8. The process for the preparation of an iron cyclopentadienide which comprises the liquid phase reaction of a compound of the following structural formula:

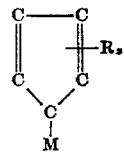

in which M is an alkali metal, R is an aliphatic hydrocarbon radical, and $x$ is an integer from zero to 5 with an anhydrous inorganic ferrous salt in the presence of a non-aqueous liquid reaction medium.

9. The process for the production of iron biscyclopentadienyl which comprises the liquid phase reaction of an alkali metal cyclopentadienyl with an anhydrous inorganic ferrous salt in the presence of a non-aqueous liquid reaction medium.

10. The process for the production of iron biscyclopentadienyl which comprises the liquid phase reaction of an alkali metal cyclopentadienyl with an anhydrous inorganic ferrous salt in the presence of a lower alkanol.

References Cited in the file of this patent

Kealy et al.: Nature, vol. 168, pp. 1039–40, Dec. 15, 1951.

Miller et al.: J. Chem. Soc. (London), February 1952, pp. 632–635.